(12) United States Patent
Taniguchi et al.

(10) Patent No.: US 11,920,786 B2
(45) Date of Patent: Mar. 5, 2024

(54) REGENERATIVE BURNER, INDUSTRIAL FURNACE AND METHOD FOR PRODUCING A FIRED ARTICLE

(71) Applicant: NGK INSULATORS, LTD., Nagoya (JP)

(72) Inventors: Satoshi Taniguchi, Nagoya (JP); Takeshi Tokunaga, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 315 days.

(21) Appl. No.: 16/174,671

(22) Filed: Oct. 30, 2018

(65) Prior Publication Data

US 2019/0137099 A1    May 9, 2019

(30) Foreign Application Priority Data

Nov. 6, 2017  (JP) .................................. 2017-214164

(51) Int. Cl.
*F23L 15/02*    (2006.01)
*F23C 5/28*    (2006.01)
*F23D 14/66*    (2006.01)

(52) U.S. Cl.
CPC ............... *F23L 15/02* (2013.01); *F23C 5/28* (2013.01); *F23D 14/66* (2013.01); *F23C 2900/05081* (2013.01)

(58) Field of Classification Search
CPC ... F23L 15/02; F23C 5/28; F23C 2900/03005; F23C 2900/05081; F23D 14/66;
(Continued)

(56) References Cited

U.S. PATENT DOCUMENTS 4,035,137 A * 7/1977 Arand ..................... F23C 9/006
431/115
4,747,771 A * 5/1988 Goodfellow ............ F23L 15/02
431/62
(Continued)

FOREIGN PATENT DOCUMENTS

CN    206207405 U   *  5/2017   ........... Y02E 20/348
DE    695 27 288 T2    4/2003
(Continued)

OTHER PUBLICATIONS

JP-2012057830-A machine translation (Year: 2022).*
(Continued)

*Primary Examiner* — Vivek K Shirsat
(74) *Attorney, Agent, or Firm* — BURR PATENT LAW, PLLC

(57) ABSTRACT

A regenerative burner including: a combustion chamber; a heat exchange chamber; and a communication passage therebetween, the combustion chamber includes a tip of a fuel nozzle and a flame ejection port, and is configured such that fuel introduced from the fuel nozzle into the combustion chamber can be burned in the combustion chamber using combustion air introduced into the combustion chamber through the communication passage to eject flame from the flame ejection port; the fuel nozzle is configured such that fuel burned in the regenerative burner is introduced into the combustion chamber; and the heat exchange chamber comprises a heat accumulator interposed between the communication passage and an air port, and is configured such that combustion air can pass through the heat accumulator and then be introduced into the combustion chamber such that an exhaust gas passes through the heat accumulator and is discharged from the air port.

9 Claims, 11 Drawing Sheets

(58) Field of Classification Search
CPC ... F23D 14/20; F27B 9/12; F27B 9/20; Y02E 20/348
USPC .................................................. 431/115, 116
See application file for complete search history.

(56) References Cited

U.S. PATENT DOCUMENTS

| | | | | |
|---|---|---|---|---|
| 4,807,695 | A * | 2/1989 | Ward | F23L 15/02 431/215 |
| 4,828,483 | A * | 5/1989 | Finke | F23C 6/045 431/11 |
| 4,923,391 | A * | 5/1990 | Gitman | B05B 7/0861 431/11 |
| 4,942,832 | A * | 7/1990 | Finke | F23N 1/022 431/115 |
| 4,983,118 | A * | 1/1991 | Finke | F23L 15/02 431/115 |
| 5,314,170 | A * | 5/1994 | Tada | F27B 9/40 266/252 |
| 7,946,844 | B2 * | 5/2011 | Yasue | F23L 15/02 431/215 |
| 2014/0011150 | A1 * | 1/2014 | Miyata | F27B 9/20 432/152 |
| 2018/0231242 | A1 * | 8/2018 | Schalles | F23C 1/08 |

FOREIGN PATENT DOCUMENTS

| | | | |
|---|---|---|---|
| EP | 0 696 707 A2 | 2/1996 | |
| EP | 0 756 135 A1 | 1/1997 | |
| JP | H02-302503 A | 12/1990 | |
| JP | H06-159613 A1 | 6/1994 | |
| JP | H06-272851 A | 9/1994 | |
| JP | H08-121712 A1 | 5/1996 | |
| JP | H11-325420 A | 11/1999 | |
| JP | 2006-308249 A1 | 11/2006 | |
| JP | 2012057830 A * | 3/2012 | |
| KR | 20160013396 A * | 2/2016 | ............. F23L 15/02 |
| KR | 20160013396 A * | 4/2016 | |
| WO | 2012/128172 A1 | 9/2012 | |
| WO | WO-2017040377 A1 * | 3/2017 | ...... F27B 2009/3638 |

OTHER PUBLICATIONS

Japanese Office Action (Application No. 2017-214164) dated Jun. 1, 2021 (with English translation).
Japanese Office Action (with English translation), Japanese Application No. 2017-214164, dated Oct. 26, 2021 (6 pages).
German Office Action, German Application No. 10 2018 008 522.9, dated May 10, 2022 (9 pages).

* cited by examiner

[FIG. 1]
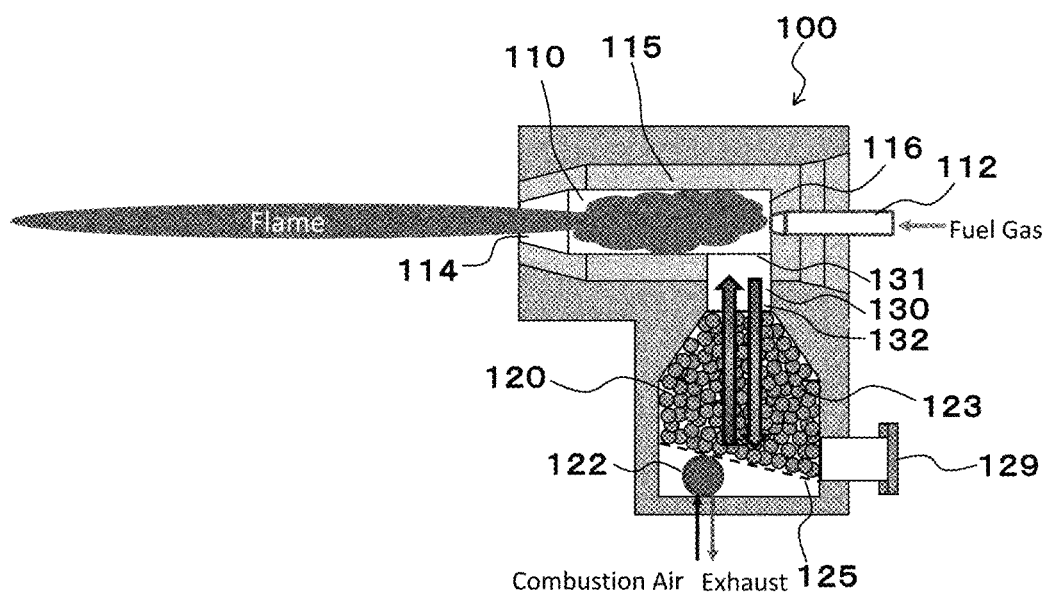

[FIG. 2]
PRIOR ART
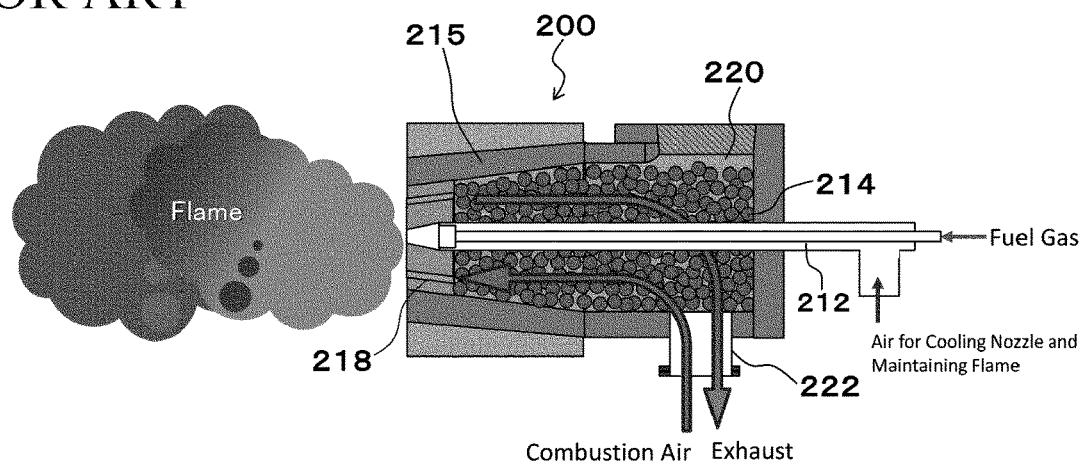

[FIG. 3]
PRIOR ART
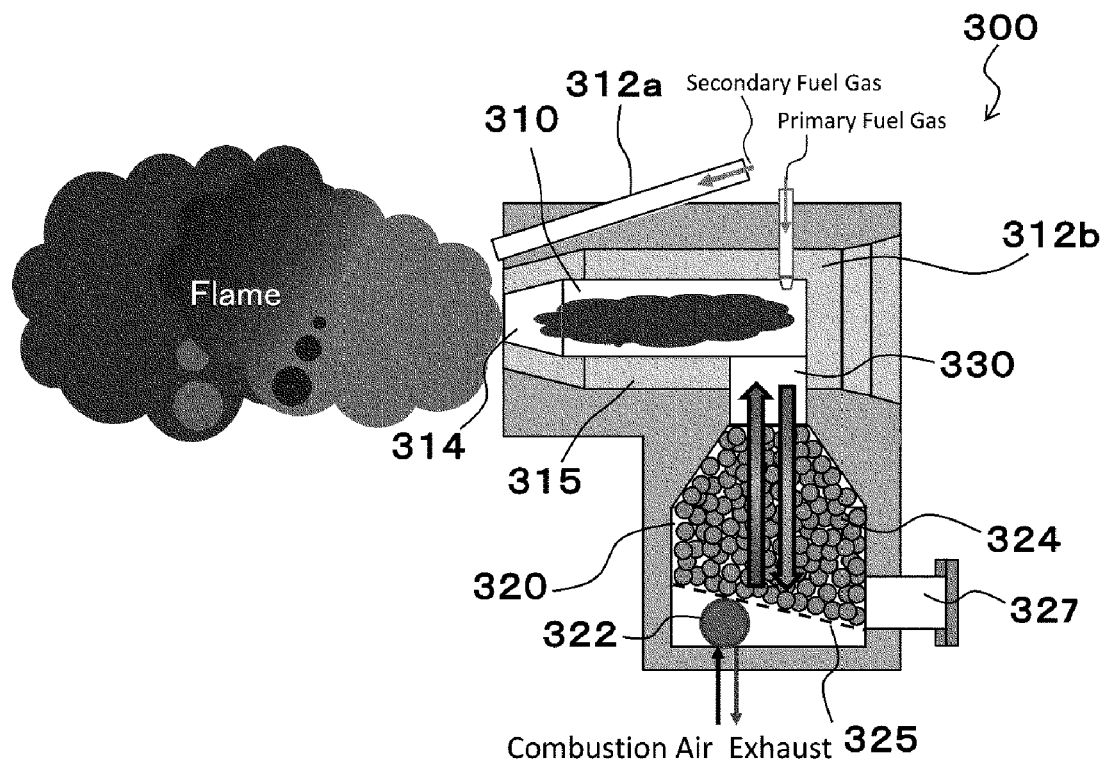

[FIG. 4]
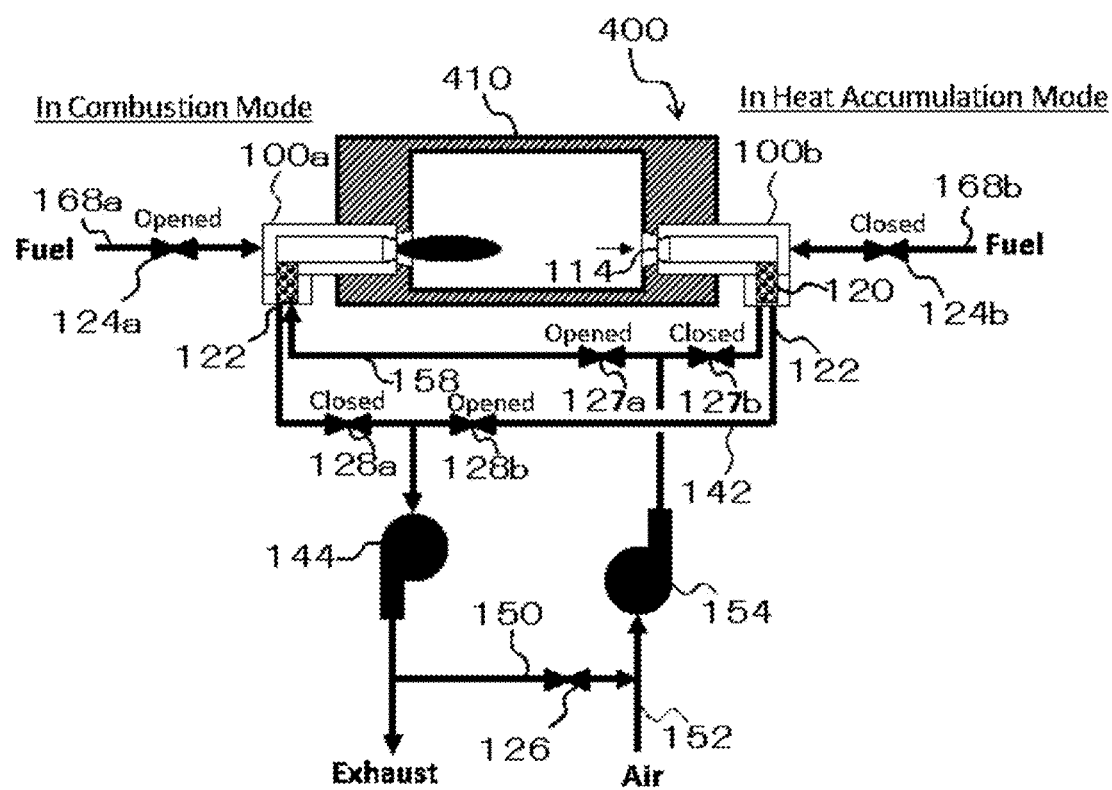

[FIG. 5]
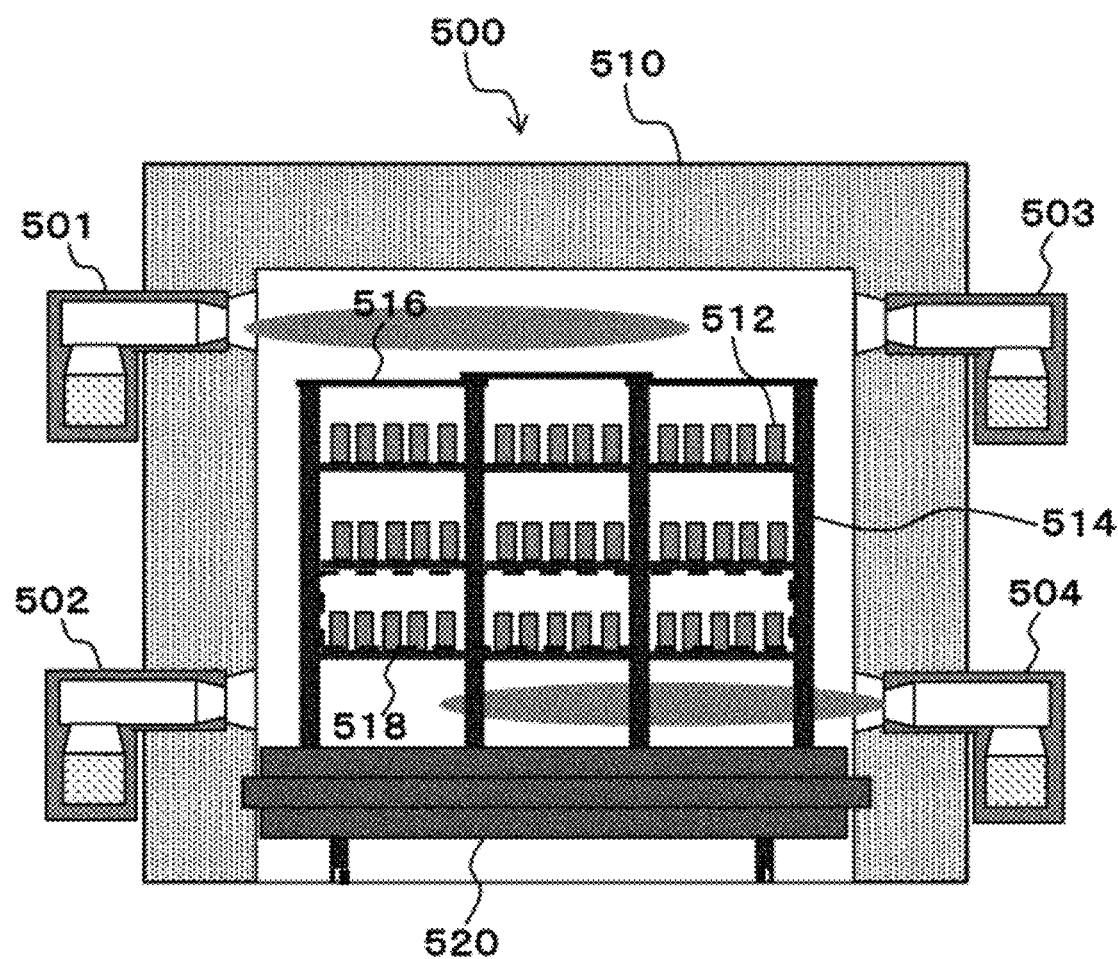

[FIG. 6]
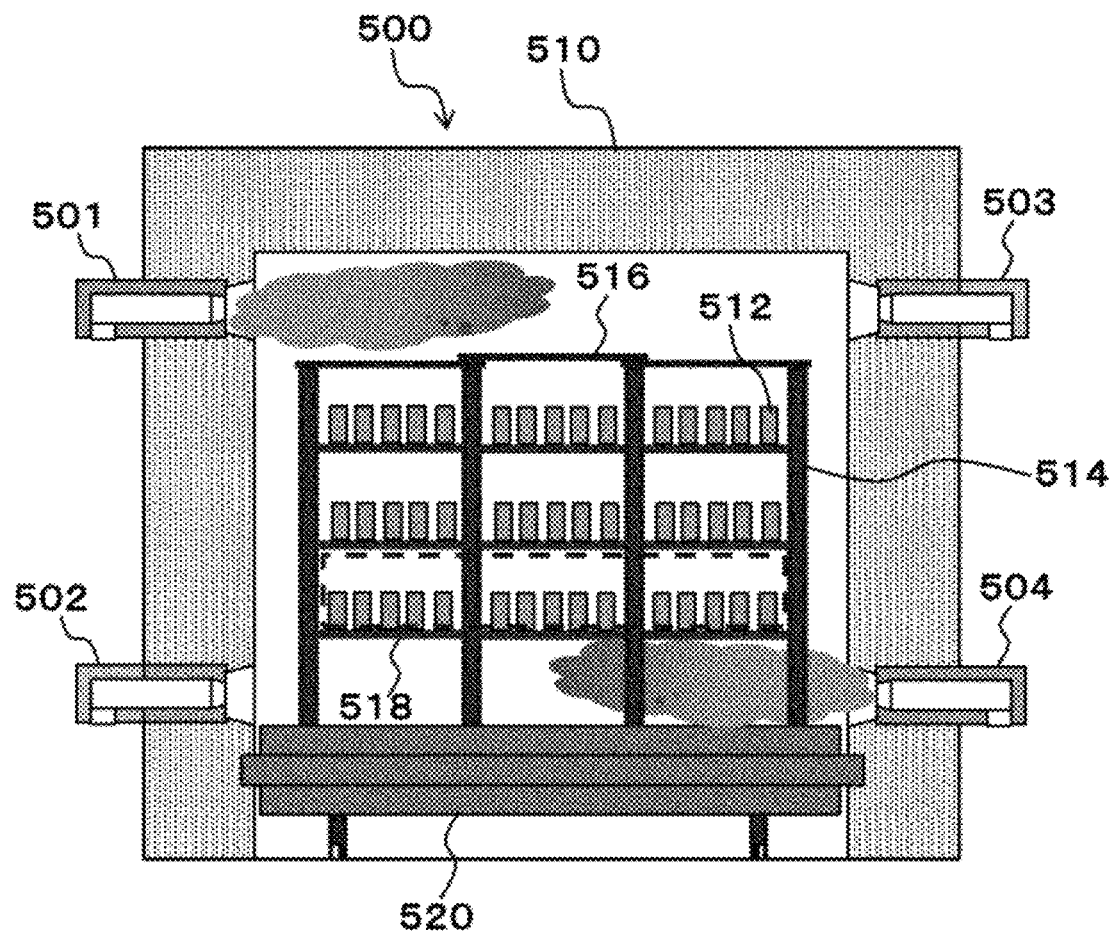

[FIG. 7]
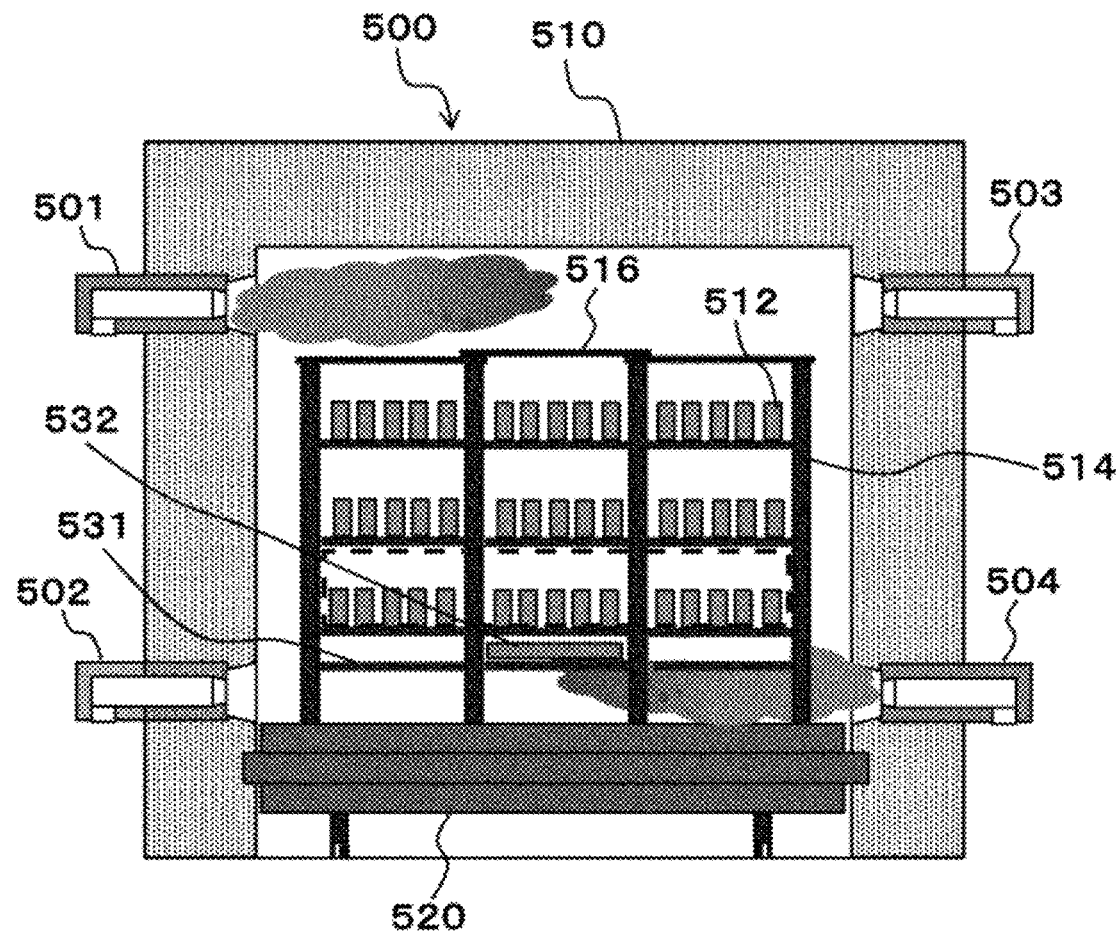

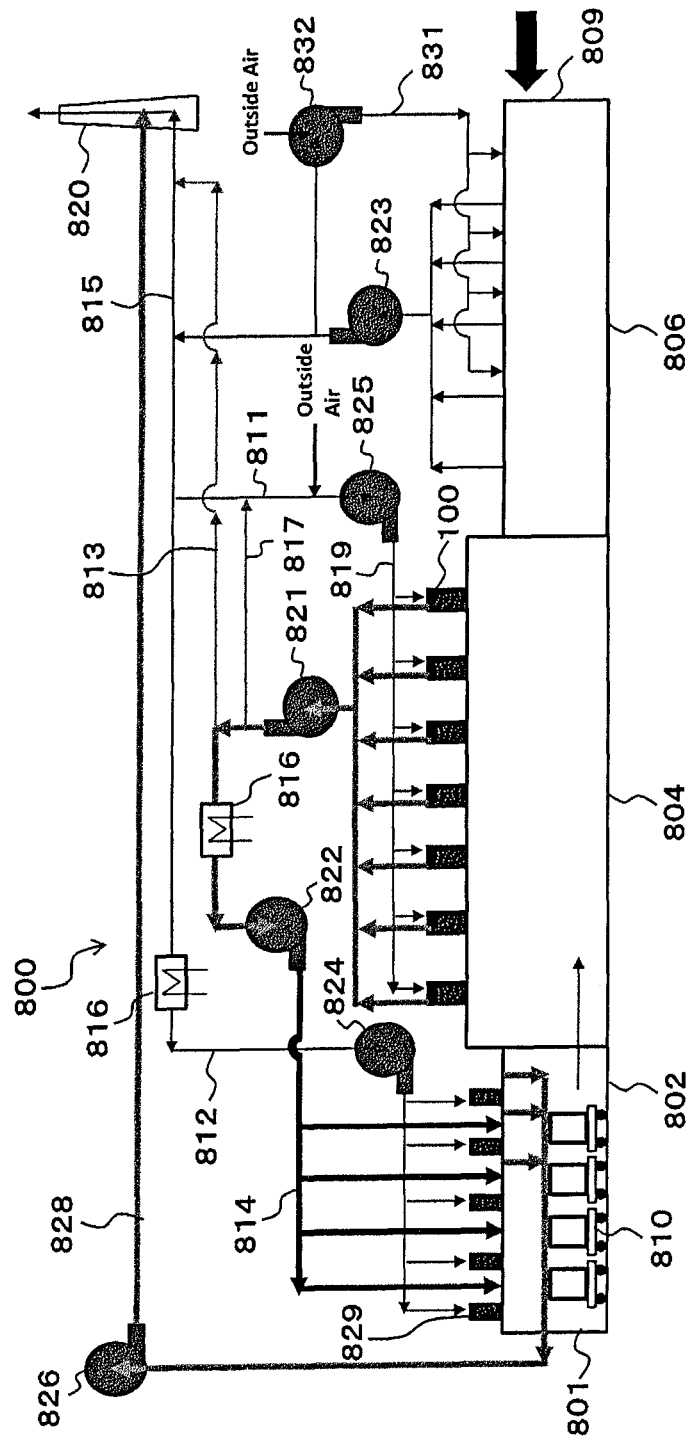
[FIG. 8]

[FIG. 12]
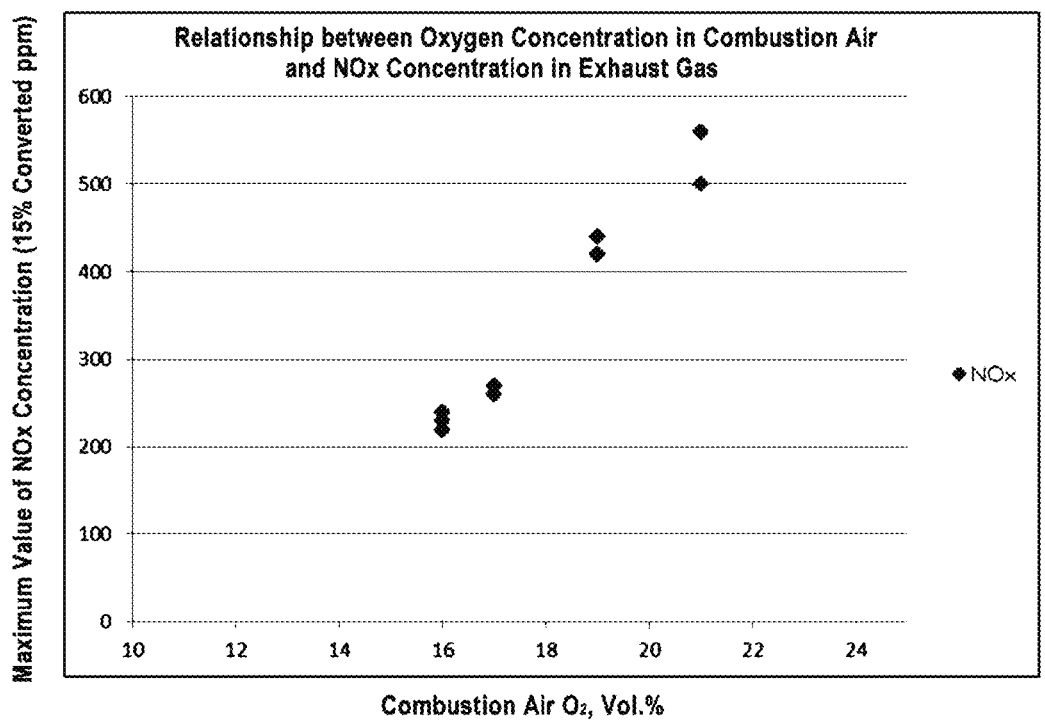

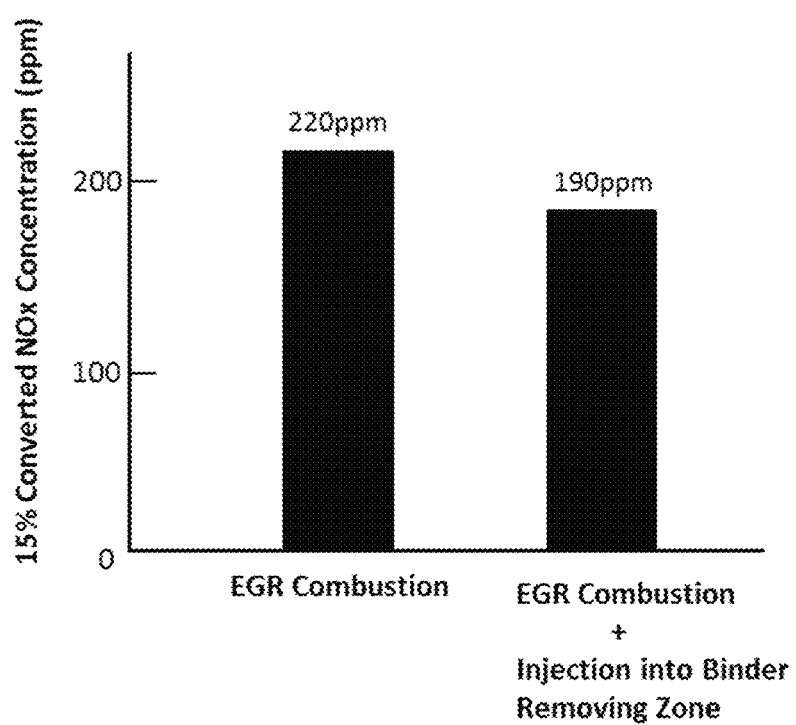
[FIG. 13]

REGENERATIVE BURNER, INDUSTRIAL FURNACE AND METHOD FOR PRODUCING A FIRED ARTICLE

BACKGROUND OF THE INVENTION

1. Field of the Invention

The present invention relates to a regenerative burner. The present invention also relates to an industrial furnace including a regenerative burner. The present invention also relates to a method for producing a fired article using the regenerative burner.

2. Description of Related Art

A regenerative burner is conventionally known as a combustion apparatus for use in a heating furnace, a combustion furnace or the like. The regenerative burner has a function of burning fuel, as well as a function of recovering heat of a combustion exhaust gas by heat accumulator installed therein. The regenerative burner alternately repeats combustion and exhaust, allows recovery of waste heat by the burner itself, and enables highly efficient combustion. Therefore, the regenerative burner is employed in various industrial furnaces and becomes widespread, because the generative burner reduces fuel consumption of the combustion apparatus and contributes to energy saving.

A conventional regenerative burner has incorporated a method of injecting preheated combustion air having elevated temperature and a fuel gas separately, mixing them outside a burner tile, and performing slow combustion, in order to reduce thermal NOx. Therefore, as shown in FIG. 2 of the present application, the conventional regenerative burner has a structure in which the total amount of fuel is mixed with combustion air and combusted outside a burner tile 215, because a tip of a fuel nozzle 212 and a tip of an air hole 218 are provided at a tip of a burner 200 on a furnace inner side (e.g., Japanese Patent Application Publication No. H08-121712 A). Further, as shown in FIG. 3 of the present application, there is also a regenerative burner 300 in which two nozzles, a main nozzle 312a and a sub-nozzle 312b, are provided as fuel nozzles, and a part of fuel is combusted inside a burner tile 315 (e.g., Japanese Patent Application Publication No. H06-159613 A, and Japanese Patent Application Publication No. 2006-308249 A).

CITATION LIST

Patent Literatures

Patent Document 1: Japanese Patent Application Publication No. H08-121712 A
Patent Document 2: Japanese Patent Application Publication No. H06-159613 A
Patent Document 3: Japanese Patent Application Publication No. 2006-308249 A

SUMMARY OF THE INVENTION

Technical Problem

Since the conventional regenerative burner incorporates the structure as described above, in the conventional regenerative burner, flame does not proceed straight ahead but spreads in up, down, right and left directions when burning. Therefore, with the conventional regenerative burner, an in-furnace stirring effect by flame is lower, so that it is difficult to have a uniform temperature distribution in the furnace. For example, the conventional regenerative burner causes defects such as melting defects generated in workpieces near the flame, and an overtired state of a part of the workpieces due to concentration of a calorific value at a specific portion in the furnace.

In the regenerative burner of the type shown in FIG. 2, a metallic fuel nozzle is installed so as to penetrate a space filled with a heat accumulator. Therefore, when used for nearly one year the fuel nozzle oxidizes to develop rust on the surface. The rust peels off and the rust is entrained in the combustion air and scattered within the furnace. Thereby, such a type of regenerative burner frequently generates defects that a fired article has discolored spots on the surface.

The present invention has been created in light of the above circumstances. An object of the present invention is to provide a regenerative burner in which flame proceeds in a highly straight direction. Another object of the present invention is to provide an industrial furnace including such a regenerative burner. A further object of the present invention is to provide a method for producing a fired article using such a regenerative burner.

Solution to Problem

As a result of extensive studies to solve the above problems, the present inventors have found out that conventional research and development of the regenerative burner excessively focused on reduction of thermal NOx. In other words, the present inventors have found out that the conventional research and development of the regenerative burner neglected a negative aspect of the thermal NOx countermeasure, that is, a problem of a decrease in a product yield. Therefore, the present inventors have changed mindset and reviewed a novel structure of the regenerative burner from the standpoint of focusing on improvement of the yield, and as a result, the present inventors have found that it has been effective to inject the total amount of fuel into a burner tile, burn out the fuel inside the burner tile, and eject high speed flame from a nozzle.

The present invention has been completed based on the above findings. In one aspect, the present invention relates to a regenerative burner comprising: a combustion chamber; a heat exchange chamber; and a communication passage between the combustion chamber and the heat exchange chamber,
  wherein the combustion chamber comprises a tip of a fuel nozzle and a flame ejection port, and the combustion chamber is configured such that fuel introduced from the fuel nozzle into the combustion chamber can be burned in the combustion chamber using combustion air introduced into the combustion chamber through the communication passage to eject flame from the flame ejection port;
  wherein the fuel nozzle is configured such that a total amount of fuel burned in the regenerative burner is introduced into the combustion chamber; and
  wherein the heat exchange chamber comprises: an air port; and a heat accumulator interposed between the communication passage and the air port, and the heat exchange chamber is configured such that combustion air introduced from the air port into the heat exchange chamber can pass through a space filled with the heat accumulator and then be introduced into the combustion chamber through the communication passage, and such that an exhaust gas introduced into the heat exchange chamber through the communication passage can pass through the space filled with the heat accumulator and then be discharged from the air port.

In another embodiment of the regenerative burner according to the present invention, the tip of the fuel nozzle is disposed at a position opposite to the flame ejection port.

In yet another embodiment of the regenerative burner according to the present invention, the regenerative burner is configured such that an exhaust gas from at least one other regenerative burner can be introduced as a part or all of the combustion air through the air port.

In yet another embodiment of the regenerative burner according to the invention, the air port is in communication with a combustion air fan for supplying the combustion air, and an inlet of the combustion air fan is in communication with an outlet of an exhaust fan for discharging an exhaust gas from the at least one other regenerative burner.

In another aspect, the present invention relates to an industrial furnace comprising a plurality of regenerative burners according to the present invention.

In one embodiment of the industrial furnace according to the present invention, at least one of the plurality of regenerative burners comprises the regenerative burner according to the present invention; and each of the regenerative burners is configured such that an exhaust gas from at least one other regenerative burner can be introduced as a part or all of combustion air through the air port.

In another embodiment of the industrial furnace according to the present invention, the industrial furnace is a continuous industrial furnace comprising: an inlet; a binder removing zone; a firing zone; a cooling zone; and an outlet in this order, and being configured to fire at least one ceramic formed article containing an organic binder while transporting it from the inlet toward the outlet;
  a plurality of regenerative burners according to the present invention are disposed in the firing zone; and
  the industrial furnace comprises at least one return line that can supply an in-furnace gas in the firing zone to the binder removing zone.

In another aspect, the present invention relates to a method for producing at least one fired article using the industrial furnace according to the present invention, the method comprising: removing a binder from at least one ceramic formed article containing an organic binder in the binder removing zone; firing the ceramic formed article after removing the organic binder in the firing zone; and cooling the fired ceramic formed article in the cooling zone.

Advantageous Effects of Invention

The use of the regenerative burner according to the present invention provides flame having higher straightness. The flame having higher straight is ejected at a high speed into the furnace, so that the in-furnace stirring effect is higher, which contributes to equalization of the temperature distribution in the furnace. This can lead to an industrially very advantageous effect of stabilizing a product quality regardless of loading positions in the furnace and improving a product yield.

Further, in a preferred embodiment of the regenerative burner according to the present invention, it is also possible to obtain an effect of suppressing thermal NOx while improving the product yield. That is, according to the embodiment, it is possible to achieve both improvement of the production efficiency of the fired product and reduction of the environmental load, with lower costs.

BRIEF DESCRIPTION OF DRAWINGS

FIG. 1 shows a structural example of a regenerative burner according to the present invention.

FIG. 2 shows a structural example of a conventional regenerative burner.

FIG. 3 shows another structural example of a conventional regenerative burner.

FIG. 4 is a structural example of an industrial furnace including a regenerative burner according to the present invention.

FIG. 5 shows a structure of a tunnel kiln type industrial furnace according to a first embodiment.

FIG. 6 shows a structure of a tunnel kiln type industrial furnace according to Comparative Example 1.

FIG. 7 shows a structure of a tunnel kiln type industrial furnace according to Comparative Example 2.

FIG. 8 shows a configuration example of a continuous industrial furnace which is provided with an inlet; a binder removing zone; a firing zone; a cooling zone; and an outlet in this order, and which is intended to fire ceramic formed articles each containing an organic binder while conveying them from the inlet to the outlet.

FIG. 9 shows a temperature distribution in a furnace when operating an industrial furnace of Example 1.

FIG. 10 shows a temperature distribution in a furnace when operating an industrial furnace of Comparative Example 1.

FIG. 11 shows a temperature distribution in a furnace when operating an industrial furnace of Comparative Example 2.

FIG. 12 is a graph showing a relationship between an oxygen concentration in combustion air introduced into a regenerative burner and a NOx concentration in an exhaust gas.

FIG. 13 is a graph showing an effect of reducing NOx in an exhaust gas when the exhaust gas from a regenerative burner is injected into a binder removing zone.

DETAILED DESCRIPTION OF THE INVENTION

<1. Configuration of Regenerative Burner>

Hereinafter, embodiments of the present invention will be described in detail with reference to the drawings. FIG. 1 shows a structural example of a regenerative burner according to the present invention. A regenerative burner 100 includes: a combustion chamber 110; a heat exchange chamber 120; and a communication passage 130 between the combustion chamber 110 and the heat exchange chamber 120. An inner wall of the combustion chamber 110 may be formed of a burner tile 115.

In the combustion chamber 110, a tip of a fuel nozzle 112 and a flame ejection port 114 are installed. The combustion chamber 110 is configured such that a fuel introduced from the fuel nozzle 112 into the combustion chamber 110 can be burn in the combustion chamber 110 using combustion air introduced into the combustion chamber 110 through the communication passage 130 to eject flame from the flame ejection port 114. A plurality of fuel nozzles 112 or a single fuel nozzle 12 may be installed in the regenerative burner 100, but a single fuel nozzle 12 may be usually installed in terms of costs. The fuel nozzle 112 is configured such that the total amount of fuel to be burned in the regenerative burner 100 is introduced into the combustion chamber 110, thereby enabling a combustion energy generated in the combustion chamber to be increased and enabling a speed of flame ejected from the flame ejection port 114 to be increased. For example, the flame speed can be 60 m/s or more at the flame ejection port 114, or can be 80 m/s or more, and for example, from 60 to 120 m/s, and typically from 80 to 100 m/s. In the present invention, the flame speed at the ejection port is calculated by the following equation: flame speed at ejection port (m/s)=(amount of combustion air $Nm^3/s$+amount of fuel $Nm^3/s$)×((in-furnace temperature K+273)/273)/ejection port area $m^2$. Since the conventional regenerative burner burns the fuel outside the ejection port, the amount of fuel becomes zero, and the flame speed at the ejection port tends to be decreased. Further, according to the results of investigation by the present inventors, the flame with high straightness is not likely to decrease the flame speed even at a position away from the ejection port of the burner. Therefore, even if the amount of combustion air of the conventional regenerative burner is increased to have substantially the same flame speed at the ejection port as that of the regenerative burner according to the present invention, the latter which generates flame with high straightness produces a higher in-furnace stirring effect, thereby further contributing to equalization of the temperature distribution in the furnace.

It is preferable that the fuel nozzle 112 is installed in a state of being embedded in the inner wall of the combustion chamber 110 so as not to protrude from the inner wall, for the reason of preventing oxidation of the fuel nozzle 112. It is also preferable that the tip of the fuel nozzle 112 is installed at a position opposed to the flame ejection port across the combustion chamber 110 (at an innermost wall 116 of the combustion chamber 110 in the embodiment of FIG. 1), for the reason of increasing the flame speed. It is preferable that a port 131 of the communication passage 130 on the combustion chamber 110 side is installed at a position as close as possible to the fuel nozzle 112, for the reason of increasing the flame speed.

The heat exchange chamber 120 includes an air port 122 and a heat accumulator 123 interposed between the communication passage 130 and the air port 122. The heat exchange chamber 120 is configured such that the combustion air introduced from the air port 122 into the heat exchange chamber 120 can pass through a space filled with the heat accumulator 123 and then introduced into the combustion chamber 110 through the communication passage 130. The heat exchange chamber 120 is configured such that the exhaust gas introduced into the heat exchange chamber 120 through the communication passage 130 can be passed through the space filled with the heat accumulator 123 and then discharged from the air port 122. To prevent the heat accumulator 123 from entering the air port 122, the air port 122 and the heat accumulator 123 preferably separated with a breathable separator 125. Examples of the separator 125 that can be used includes a grid-like structure and a punching plate which are made of metal (e.g., SUS). To facilitate replacement of the heat accumulator 123, the heat exchange chamber 120 may be provided with an inlet/outlet 129 for the heat accumulator 123.

The heat accumulator 123 is not particularly limited, it can be provided in the form of ceramic or metal balls, a honeycomb or a mesh. A ceramic honeycomb having good heat resistance and showing decreased pressure loss may be preferably used, and an optimum material may be selected from SiC-based materials, cordierite, mullite, aluminum titanate and the like, taking corrosion resistance and heat resistance into account.

The oxygen concentration in the exhaust gas from the regenerative burner becomes lower than the oxygen concentration in the air before combustion. The use of the exhaust gas with decreased oxygen concentration as a part or all of the combustion air allows effective reduction of thermal NOx. Therefore, the regenerative burner 100 according to the present invention is preferably configured such that the exhaust gas from at least one other regenerative burner can be introduced as a part or all of the combustion air via the air port 122. The oxygen concentration in the combustion air introduced into the regenerative burner is preferably 19% by volume or less, and more preferably 17% by volume or less, in terms of effective reduction of the thermal NOx. If the oxygen concentration in the combustion air introduced into the regenerative burner is excessively low, incomplete combustion will be caused to generate black smoke more frequently. Therefore, the oxygen concentration in the combustion air is preferably 14.5% by volume or more, and more preferably 15.5% by volume or more.

In an embodiment, the air port 122 may be in communication with a combustion air fan for supplying combustion air, and an inlet of the combustion air fan may be in communication with an outlet of an exhaust fan for discharging an exhaust gas from at least one other regenerative burner. The "other regenerative burner" may be the regenerative burner according to the present invention or a regenerative burner different from the present invention, but it may preferably be the regenerative burner according to the present invention. Thus, the use of the exhaust gas from the other regenerative burner as a part or all of the combustion air will be able to allow easy reduction of the oxygen concentration in the combustion air introduced into the regenerative burner.

<2. Industrial Furnace>

One aspect of the present invention provides an industrial furnace including the regenerative burner according to the present invention. A type of the industrial furnace is not particularly limited. For example, the industrial furnace may be a continuous furnace such as a tunnel kiln, a roller hearth kiln and a pusher kiln, or may be a single furnace (batch furnace) such as a box kiln, a shuttle kiln, a cowbell kiln and an elevator kiln. Further, the industrial furnace may be either an atmospheric firing furnace or a reducing firing furnace, in terms of atmospheric conditions. The reducing firing furnace means a firing furnace for performing combustion such that an m value (a ratio of an actual combustion air amount to a theoretical air amount) is less than 1.0.

FIG. 4 illustrates a configuration example of an industrial furnace 400 including a plurality of regenerative burners 100a, 100b. At least one of the plurality of regenerative burners 100a, 100b is the regenerative burner according to the present invention as described above, and all of the regenerative burners are preferably the regenerative burners according to the present invention. In the industrial furnace 400, each of the regenerative burner 100a, 100b is configured such that the exhaust gas from the at least one other regenerative burner (typically one other regenerative burner) can be introduced as a part or all of the combustion air via each air port 122.

In the industrial furnace 400 shown in FIG. 4, one regenerative burner 100a is in combustion mode. A valve 124a installed in the middle of a fuel pipe 168a connected to the regenerative burner 100a is opened, and the fuel is supplied to the regenerative burner 100a via the fuel pipe 168a. Also, the other regenerative burner 100b is in heat accumulation mode. Since a valve 124b installed in the middle of a fuel pipe 168b connected to the regenerative burner 100b is closed, the fuel supply is interrupted.

The exhaust gas after combustion, which stays inside a furnace body 410, is sucked into the flame ejection port 114 of the regenerative burner 100b which is in heat accumulation mode, by suction force of the exhaust fan 144. Subsequently, the exhaust gas passes through the heat exchange chamber 120 to apply heat to the heat accumulator 123, and then discharged from the air port 122. The discharged exhaust gas passes through an exhaust pipe 142 and discharged from the outlet of the exhaust fan 144. It is configured such that a part of the exhaust gas discharged from the outlet of the exhaust fan 144 passes through a loop pipe 150 and flows into a combustion air fan 154. In the shown embodiment, the loop pipe 150 is connected to an air pipe 152 on the upstream side of the combustion air fan 154, so that the exhaust gas discharged from the exhaust fan 144 can join the air flowing through the air pipe 152 to flow into the combustion air fan 154.

From the outlet of the combustion air fan 154, an exhaust gas or a mixed gas of the exhaust gas and air is discharged. Since the oxygen concentration in the exhaust gas is lower than that of air, the oxygen concentration of the gas discharged from the outlet of the combustion air fan 154 will be lower than a normal oxygen concentration of about 21% by volume in the air. The adjustment of the opening degree of the valve 126 installed in the middle of the loop pipe 150 allows control of a mixing ratio of the exhaust gas with air. Although the mixing ratio may be appropriately set, the mixing ratio may be preferably selected such that the oxygen concentration in the mixed gas satisfies the conditions as discussed above. The gas discharged from the outlet of the combustion air fan 154 passes through an air pipe 158 and supplied as combustion air via the air port 122 to the regenerative burner 100a which is in combustion mode.

Switching is carried out between the regenerative burner in combustion mode and the regenerative burner in heat accumulation mode with a predetermined time cycle. As a result of the switching, the regenerative burner 100a in combustion mode will turn into heat accumulation mode, and the regenerative burner 100b in heat accumulation mode will turn into combustion mode. The switching can be performed by reversing the open/close states of the fuel valves 124a, 124b, on-off valves 128a, 128b for exhaust gas, and on-off valves 127a, 127b for combustion air. For the on-off valves 128a, 128b for exhaust gas and the on-off valves 127a, 127b for combustion air, the routes of the exhaust gas and combustion air may be switched using three-way valves. Electrically driven valves such as solenoid valves may be used as the valves. By repeating the cycle, alternating combustion is carried out. Normally, the alternating combustion is carried out with a pair of two regenerative burners with a cycle of several tens of seconds.

<3. Method for Heating Workpiece>

One aspect of the present invention provides a method for heating at least one workpiece using the industrial furnace according to the present invention. The workpiece is an article subjected to the heat treatment, including, but not limited to, electronic parts such as ferrite and ceramic condensers; semiconductor products; ceramic products; potteries; oxide-based refractories; glass products; metal products; and carbon-based refractories such as alumina-graphite and magnesia-graphite. Further, the workpiece includes kiln tools. The industrial furnace according to the present invention can be used when heating the workpiece(s) at 1000° C. or higher, and typically 1200° C. or higher, and more typically 1400° C. or higher, for example from 1000 to 2000° C. It should be noted that the concept of "heating" encompasses "firing". The applying of the present invention to a furnace at an elevated temperature, such as a firing furnace, can lead to an improved energy saving effect by the regenerative burner. FIG. 5 illustrates a structure of a tunnel kiln type industrial furnace 500 provided with a plurality of regenerative burners. The industrial furnace 500 is configured such that carriages 520 each carrying a shelf 514 loading a large number of heated products 512 move inside a furnace body 510 in the front and back direction of the page on which FIG. 5 is shown. The heated products 512 are subjected to heat treatment while the carriages 520 move inside the furnace body 510. On right and left inner walls of the furnace body 510, a set of regenerative burners 501, 502, 503, 504 are installed. The number of regenerative burners is not particularly limited, and it may be determined as needed according to the size and length of the furnace body 510. Since the alternating combustion is generally carried out with a pair of two regenerative burners, the number of the regenerative burners may preferably be an even number. It is also possible to partially use a regenerative burner(s) other than the regenerative burner according to the present invention. Although not shown, a required number of the same regenerative burner sets is installed in the front and back direction of the page.

The heated products 512 are loaded between a top board 516 forming the uppermost surface of the shelf 514 and a bottom board 518 forming the lowermost surface of the shelf 514. Each of the upper portion over the top board 516 and the lower portion below the bottom board 516 is provided with space exposed to high-speed flames from the regenerative burners 501, 502, 503, 504, respectively. A pair of right and left regenerative burners repeats combustion mode and exhaust mode, alternately. In FIG. 5, a pair of regenerative burners 501, 504 are in combustion mode and the other pair of regenerative burners 502, 503 are in heat accumulation mode. When using the regenerative burner according to the present invention, the flame is not likely to spread in all directions due to high straightness of flame. Further, since the flame is ejected at a higher speed, the effect of stirring the gas in the furnace is higher, and the temperature distribution in the furnace is easily equalized. As a result, problems such as a melting defect in the workpieces near the flame, and an overfired state of a part of the workpieces due to concentrated calorific value on a specific portion in the furnace (especially in the center portion in the furnace width direction) can be prevented.

In one embodiment, the industrial furnace may be a continuous industrial furnace which includes an inlet, a binder removing zone, a firing zone, a cooling zone and an outlet in this order and which is for firing ceramic formed articles each containing an organic binder while transporting them from the inlet to the outlet. In the firing zone, a plurality of regenerative burners according to the present invention can be installed and utilized for firing the ceramic formed articles.

FIG. 8 shows a configuration example of such a continuous industrial furnace 800. For example, a ceramic formed article containing the organic binder is loaded on the shelf on a carriage 810, enters the furnace from an inlet 801, and proceeds in the right direction of the page showing FIG. 8. In a binder removing zone 802, a step of removing the organic binder from the ceramic formed article containing the organic binder can be carried out. The ceramic formed article then proceeds to a firing zone 804, where a firing step is carried out using a plurality of regenerative burners 100. The fired ceramic formed article proceeds to a cooling zone 806, where they are cooled close to the room temperature and removed from an outlet 809. The heating temperatures in the binder removing zone 802 and the firing zone 804 are appropriately set depending on the material of the ceramic formed article and target quality. For example, when the ceramic formed article has a cordierite ceramic honeycomb structure and contains methyl cellulose and/or polyvinyl alcohol as the organic binder, the removal of the binder is carried out at about 200° C. and the firing is carried out at 1400 to 1500° C.

The continuous industrial furnace 800 preferably includes return lines 812, 814 which allow the in-furnace gas in the firing zone 804 to be supplied into the furnace in the binder removing zone. This leads to an effect of lowering the NOx concentration of the entire exhaust gas discharged from the continuous industrial furnace 800. That is, the provision of the return lines 812, 814 allows significant reduction of the NOx concentration in the exhaust gas discharged from a chimney 820 for collecting various exhaust gases from the continuous industrial furnace 800 and for discharging them.

Since an organic binder gas generated in the binder removing zone 802 burns on the surface of the ceramic formed article, the temperature of outer peripheral portion of the ceramic formed article becomes elevated, but the internal temperature remains relatively low because each ceramic formed article has good heat insulating property. Subsequently, as the internal temperature is gradually increased, the combustion of the organic binder gas progresses inside the ceramic formed article to reach a high temperature, but the temperature of the outer peripheral portion of the ceramic formed article is hardly increased because each ceramic formed article has good heat insulating property. For these reasons, a temperature difference is generated between the inner portion and the outer peripheral portion in the binder removing step, which may generate cracks due to thermal stress.

Therefore, the supply of the in-furnace gas in the firing zone 804 into the furnace in the binder removing zone 802 can provide an effect of preventing the generation of cracks in the ceramic formed article in the binder removing step. On the other hand, the oxygen concentration of the in-furnace gas in the firing zone 804 can be 10% by volume or less, for example from about 3 to 7% by volume, although the oxygen concentration varies depending on conditions. Therefore, as the oxygen concentration in the binder removing zone 802 is lowered by supplying the in-furnace gas to the binder removing zone 802 in the furnace, the combustion of the organic binder is suppressed, thereby decreasing the temperature difference between the inner portion and the peripheral portion of the ceramic formed article and suppressing the generation of cracks.

Accordingly, the continuous industrial furnace 800 may include the return line 814 for injecting the in-furnace gas in the firing zone 804 discharged from the air port of the regenerative burner 100 into the furnace in the binder removing zone 802. The gas injected into the furnace in the binder removing zone 802 may be used as the combustion air for the burner 829 in the binder removing zone 802 or may be directly injected into the furnace without using it as the combustion air for the burner 829. In the middle of the return line 814, a regenerative exhaust fan 821 on the side close to the firing zone 804 and a binder removing zone secondary combustion air fan 822 on the side close to the binder removing zone 802 are installed, which can control the amount of gas supplied to the binder removing zone 802.

Further, the continuous industrial furnace 800 can include an exhaust line 813 that branches the in-furnace gas from the firing zone 804 which has exited the regenerative exhaust fan 821, and routes it to the chimney 820.

Cooling air is injected into the cooling zone 806 by a cooling air fan 832 via a cooling air line 831. The cooling air may be ambient air. It is also possible to partially use the in-furnace gas from the cooling zone 806. The continuous industrial furnace 800 may include the return line 812 for extracting the in-furnace gas in the cooling zone 806 and injecting it into furnace in the binder removing zone 802. In the middle of the return line 812, a cooling zone exhaust fan 823 and a binder removing zone combustion air fan 824 are installed, which can control the amount of a gas supplied to the binder removing zone 802. The in-furnace gas in the cooling zone 806 can also be used as the combustion air for the burner 829 installed in the binder removing zone 802, for the reason of energy saving. Further, the continuous industrial furnace 800 may include an exhaust line 815 that branches the in-furnace gas from the cooling zone 806 which has exited the cooling zone exhaust fan 823 and routes it to the chimney 820. The exhaust gas from the binder removing zone 802 can be sucked by a binder removing exhaust fan 826 and routed to the chimney 820 via an exhaust pipe 828.

In the continuous industrial furnace 800, the combustion air used for the regenerative burners 100 installed in the firing zone 804 is supplied through an air pipe 819 using blowing force of a combustion air fan 825. The combustion air that can be used includes any of ambient air, the in-furnace gas from the firing zone 804 which has exited the regenerative exhaust fan 821, and the in-furnace gas from the cooling zone 806 which has exited the cooling zone exhaust fan 823, or a mixed gas of two or more of these. Therefore, the continuous industrial furnace 800 may include a loop pipe 817 for routing the in-furnace gas from the firing zone 804 that has exited the regenerative exhaust fan 821 to the air pipe 819. Further, the continuous industrial furnace 800 may include a pipe 811 for routing the in-furnace gas from the cooling zone 806 which has exited the cooling zone exhaust fan 823 to the combustion air fan 825. The energy saving effect can be obtained by using hot air discharged from the cooling zone as the combustion air.

If the temperature of the in-furnace gas in the firing zone 804 and/or the cooling zone 806 is too high to supply it to the binder removing zone 802, a heat remover 816 may be provided in the return lines 812, 814 as needed. Examples of the heat remover 816 that can be used include heat exchangers.

EXAMPLES

Hereinafter, Example for better understanding of the present invention and its advantages are illustrated together with Comparative Examples, but the present invention is not limited to the Example.

Example 1

Figures 9, 10, 11:
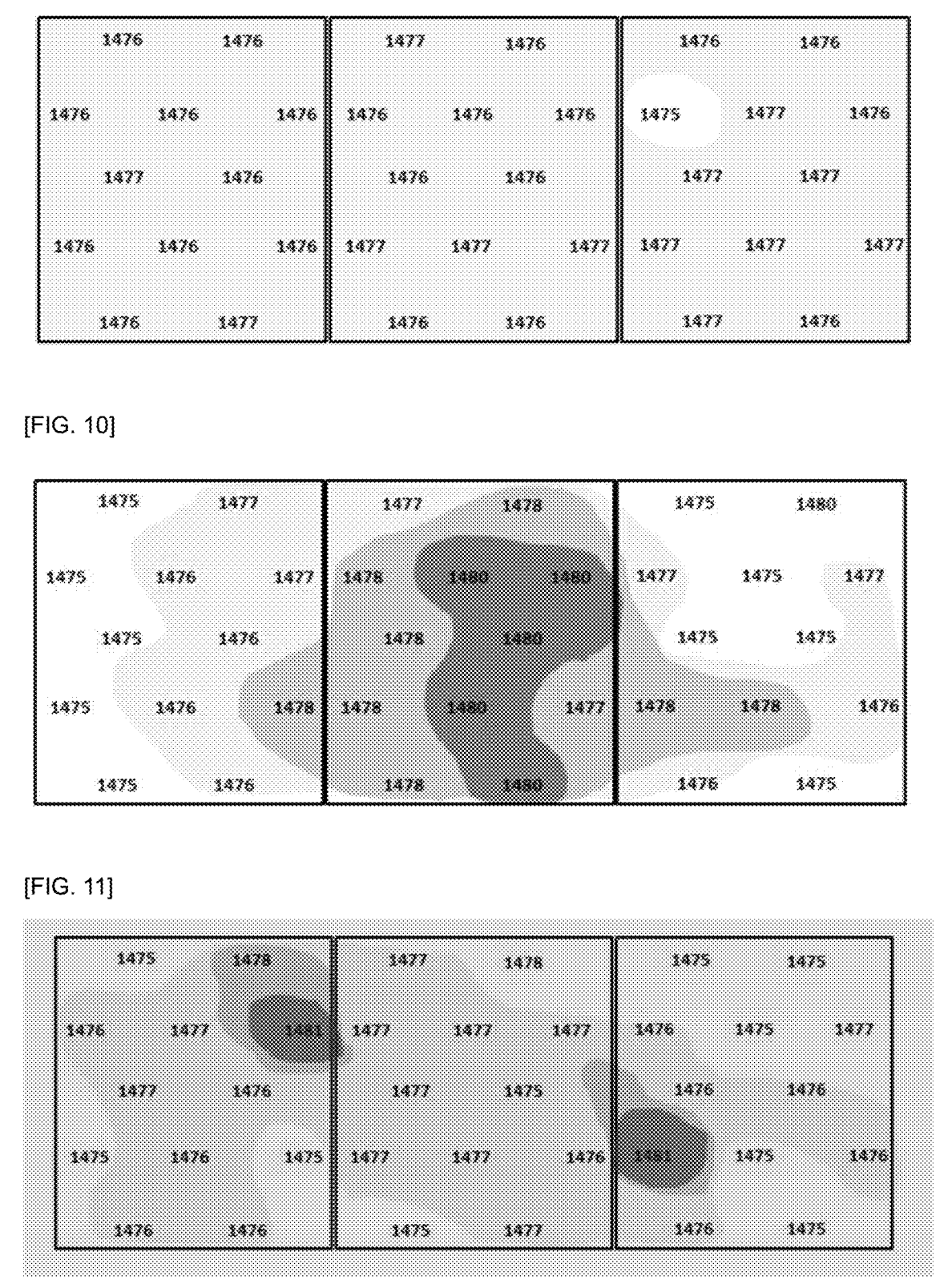

Using a tunnel kiln type firing furnace having the structure and arrangement of the regenerative burners shown in FIG. 5, cordierite honeycomb formed articles were loaded on a shelf in the arrangement as shown in FIG. 5, and a firing test was conducted. In this case, an operation of mixing the exhaust gas from the regenerative burners with the combustion air by utilizing the loop pipe 817 (EGR: Exhaust Gas Recirculation) was carried out, but the in-furnace gas in the firing zone 804 discharged from the air ports of the regenerative burners was not injected into the binder removing zone 802 via the return line 814. In all of the regenerative burners used, each fuel nozzle was configured such that the fuel was introduced only into the combustion chamber, and they were regenerative burners each having the structure shown in FIG. 1, which ejected high-speed flame proceeding straight ahead, and the alternating combustion was performed alternately using the right and left burners. Temperature measurement chips (REFERTHERMO) were loaded on the first stage from the bottom of the shelf, which was surrounded by the dotted line in FIG. 5, and temperature distribution measurement was carried out under normal mass production firing conditions. The results are shown in FIG. 9 (unit: ° C.). It can be seen that a difference between the maximum temperature and the minimum temperature is only 2° C., and the temperature distribution with high uniformity is obtained in the furnace width direction and the furnace height direction. This would be due to the high straightness of flame.

Comparative Example 1

Using a tunnel kiln type firing furnace having the structure and arrangement of the regenerative burners shown in FIG. 6, cordierite ceramic formed articles were loaded on a shelf in the arrangement as shown in FIG. 6, and a firing test was conducted. The reference numerals shown in FIG. 6 mean the same components as those in FIG. 5. However, in the firing furnace of Comparative Example 1, the slow combustion type regenerative burners shown in FIG. 2 were used as the regenerative burners. Other configurations were the same as those in Example 1. The firing furnace of Comparative Example 1 was subjected to the heating test under the same operating conditions as those in Example 1 to analyze the furnace temperature distribution of the firing zone in the same method as that in Example 1. The results are shown in FIG. 10. It was observed that the flame tended to spread in all directions and an elevated temperature region tended to concentrate at the center part in the furnace width direction because the slow combustion was performed outside the burner tile. The difference between the maximum temperature and the minimum temperature was increased to 5° C. In Comparative Example 1, melting defects of the products due to the flame blown up from the gaps in the shelf were also observed.

Comparative Example 2

Using a tunnel kiln type firing furnace having the structure and arrangement of the regenerative burners shown in FIG. 7, ceramic formed articles were loaded on a shelf in the arrangement as shown in FIG. 7, and a firing test was conducted. The reference numerals shown in FIG. 7 mean the same components as those in FIG. 5. However, in the firing furnace of Comparative Example 2, the slow combustion type regenerative burners shown in FIG. 2 were used as the regenerative burners. Further, in the firing furnace of Comparative Example 2, a flame shielding plate 531 called "waste plate" was installed below the first shelf board from the bottom and a heat insulating material 532 was laid on the central part of the waste plate where the calorific value concentrated, in order to prevent melting defects due to blowing-up of flame and to prevent quality variations of the fired articles due to bad temperature distribution at the center portion in the furnace width direction. Other configurations were the same as those in Comparative Example 1. The firing furnace of Comparative Example 2 was subjected to the heating test under the same operating conditions as those in Example 1 to analyze the furnace temperature distribution of the firing zone in the same method as that of Example 1. The results are shown in FIG. 11. Although a high temperature part was locally observed, the installation of the waste plate and the heat insulating material provided the improved temperature distribution that was applicable to mass production. However, Comparative Example 2 had to use kiln tools (consumable articles) such as the waste plate and the heat insulating material. Therefore, Example 1 has higher practicability than Comparative Example 2.

<Relationship Between Oxygen Concentration in Combustion Air and NOx Concentration in Exhaust Gas>

In the firing furnace used in Example 1, a confirmation test of the effect of reducing NOx by EGR. A pair of two regenerative burners was used to have a loop pipe structure shown in FIG. 4. In this case, the oxygen concentration in the combustion air was changed by controlling the amount of the exhaust gas passing through the loop pipe, and a change of the NOx concentration in the exhaust gas during the alternating combustion of the regenerative burners was observed. After the operation was started and the furnace temperature became stable, the NOx concentration in the exhaust gas discharged from the chimney was measured. The results are shown in FIG. 12. It was observed that the NOx concentration which was from 500 to 550 ppm by volume for the oxygen concentration in the combustion air of 21% by volume was decreased as the oxygen concentration in the combustion air was decreased, and the NOx concentration for the oxygen concentration in the combustion air of 16% by volume was decreased to about 220 ppm by volume. In FIG. 12, each NOx concentration means a value obtained by converting the oxygen concentration in the combustion air to 15% by volume.

<Effect of NOx Reduction by Injecting Exhaust Gas into Binder Removing Zone>

In the firing furnace used in Example 1, a return rate (about 28% by volume of the exhaust gas) was automatically controlled such that a part of the exhaust gases from the regenerative burners was mixed with the combustion air using the loop pipe to control the oxygen concentration in the combustion air to about 16% by volume. In addition, approximately from 50 to 70% by volume of the exhaust gases from the regenerative burners was injected into the binder removing zone using the return line 814. The NOx concentrations in the exhaust gases discharged from the chimney were compared based on the presence and absence of injection into the binder removing zone. For each operating condition, after the operation was started and the furnace temperature became stable, the NOx concentration was measured. The results are shown in FIG. 13. As can be seen from FIG. 13, the NOx concentration was decreased by 10% or more, by injecting a part of the exhaust gases from the regenerative burners into the binder removing zone.

INDUSTRIAL APPLICABILITY

The regenerative burner according to the present invention can be effectively used, for example, in industrial fields that employ industrial furnaces operated at a high temperature exceeding 1000° C., such as, for example, pottery industry, electronic part manufacturing industry, ceramic manufacturing industry, glass manufacturing industry, refractory manufacturing industry, and steel industry.

DESCRIPTION OF REFERENCE NUMERALS 100 (100a, 100b) regenerative burner
110 combustion chamber 112 fuel nozzle
114 flame ejection port
115 burner tile
116 innermost wall
120 heat exchange chamber
122 air port
123 heat accumulator
124a, 124b valve
125 separator
126 valve
127a, 127b on-off valve for combustion air
128a, 128b on-off valve for exhaust gas
129 inlet/outlet
130 communication passage
131 port on combustion chamber side
132 port on heat exchange chamber side
142 exhaust pipe
144 exhaust fan
150 loop pipe
152 air pipe
154 combustion air fan
158 air pipe
168a, 168b fuel pipe
200 regenerative burner
212 fuel nozzle
214 heat accumulator
215 burner tile
218 air hole
220 heat exchange chamber
222 air port
324 heat accumulator
300 regenerative burner
310 combustion chamber
312a, 312b fuel nozzle
314 flame ejection port
315 burner tile
320 heat exchange chamber
322 air port
324 heat accumulator
400 industrial furnace
410 furnace body
500 industrial furnace
512 heated product
514 shelf
516 top board
518 bottom board
501, 502, 503, 504 regenerative burner
531 flame shielding plate
532 thermal insulating material
800 industrial furnace
801 inlet
802 binder removing zone
804 firing zone
806 cooling zone
809 outlet
810 carriage
811 pipe
812, 814 return line
815 exhaust line
816 heat remover
817 loop pipe
819 air pipe
820 chimney
821 regenerative exhaust fan
822 binder removing zone secondary combustion air fan
823 cooling zone exhaust fan
824 binder removing zone combustion air fan
825 combustion air fan
826 binder removing exhaust fan
828 exhaust pipe
829 burner
831 cooling air line
832 cooling air fan

What is claimed is:

1. A regenerative burner comprising: a combustion chamber; a heat exchange chamber; and a communication passage between the combustion chamber and the heat exchange chamber,
wherein the combustion chamber comprises a tip of a fuel nozzle and a flame ejection port, and the combustion chamber is configured such that fuel introduced from the fuel nozzle into the combustion chamber can be burned in the combustion chamber using combustion air introduced into the combustion chamber through the communication passage to produce a flame within the combustion chamber before the flame is ejected from the flame ejection port;
wherein the fuel nozzle is configured such that a total amount of fuel burned in the regenerative burner is introduced into the combustion chamber;
wherein the heat exchange chamber comprises: an air port provided on a wall of the heat exchange chamber such that the air port is perpendicular to a port of the communication passage on a combustion chamber side, and a heat accumulator interposed between the communication passage and the air port, and the heat exchange chamber is configured such that combustion air introduced from the air port into the heat exchange chamber can pass through a space filled with the heat accumulator and then be introduced into the combustion chamber through the communication passage, and such that an exhaust gas introduced into the heat exchange chamber through the communication passage can pass through the space filled with the heat accumulator and then be discharged from the air port; and
wherein a port of the communication passage on the combustion chamber side is disposed on a surface of the combustion chamber perpendicular to a surface of the combustion chamber on which the fuel nozzle is disposed.

2. The regenerative burner according to claim 1, wherein the tip of the fuel nozzle is disposed at a position opposite to the flame ejection port.

3. The regenerative burner according to claim 1, wherein the regenerative burner is configured such that an exhaust gas from at least one other regenerative burner can be introduced as a part or all of the combustion air through the air port.

4. The regenerative burner according to claim 3, wherein the air port is in communication with a combustion air fan for supplying the combustion air, and an inlet of the combustion air fan is in communication with an outlet of an exhaust fan for discharging an exhaust gas from the at least one other regenerative burner.

5. An industrial furnace comprising a plurality of regenerative burners according to claim 1.

6. The industrial furnace according to claim 5,
wherein each of the regenerative burners is configured such that an exhaust gas from at least one other regenerative burner can be introduced as a part or all of combustion air through the air port.

7. The industrial furnace according to claim 5,
wherein the industrial furnace is a continuous industrial furnace comprising: an inlet; a binder removing zone;

a firing zone; a cooling zone; and an outlet in this order, and being configured to fire at least one ceramic formed article containing an organic binder while transporting it from the inlet toward the outlet;

wherein a plurality of regenerative burners according to claim 1 are disposed in the firing zone; and wherein the industrial furnace comprises at least one return line that can supply an in-furnace gas in the firing zone to the binder removing zone.

8. A method for producing at least one fired article using the industrial furnace according to claim 7, the method comprising:

removing a binder from at least one ceramic formed article containing an organic binder in the binder removing zone;

firing the ceramic formed article after removing the organic binder in the firing zone; and cooling the fired ceramic formed article in the cooling zone.

9. The regenerative burner according to claim 1, wherein the heat exchange chamber comprises an inlet/outlet port configured to facilitate replacement of the heat accumulator.

\* \* \* \* \*